United States Patent Office 3,471,469
Patented Oct. 7, 1969

3,471,469
WATER-SOLUBLE MONOAZO-PYRAZOLONE
DYESTUFFS
Fritz Meininger and August Bauer, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 23, 1967, Ser. No. 640,491
Claims priority, application Germany, June 4, 1966, F 49,400
Int. Cl. C07d 29/22
U.S. Cl. 260—163                                             1 Claim

ABSTRACT OF THE DISCLOSURE

Water-soluble monoazo dyestuff of the formula

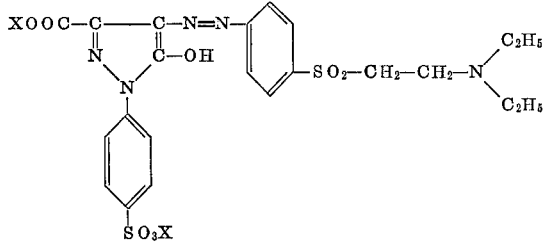

wherein X represents a hydrogen atom or an alkali metal atom.

---

The present invention relates to a new water-soluble monoazo dyestuff and to a process for its preparation; it relates especially to the dyestuff of the formula

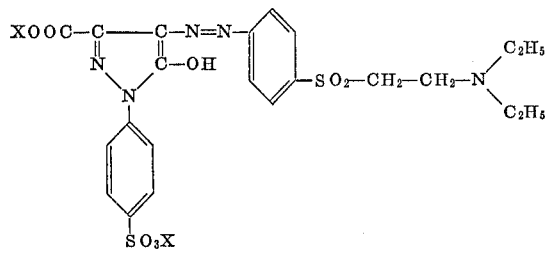

wherein X represents a hydrogen atom or an alkali metal atom, such as sodium or potassium.

Now, it has been found that the water-soluble monoazo dyestuff of the above mentioned formula can be prepared by reacting the monoazo dyestuff of the formula

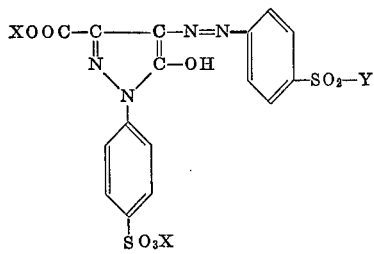

wherein Y represents a group of the formula

—$CH_2$—$CH_2$—O—$SO_3X$ or of the formula —CH=$CH_2$ and X has the above mentioned meaning, in an aqueous medium with diethylamine, if desired under addition of an alkaline agent.

The process for the preparation of the new monoazo dyestuff is suitably carried out in such a way that, when using a dyestuff containing a β-hydroxyethyl-sulfonyl-sulfuric acid ester group, an aqueous solution, which contains 1 mol of this starting compound in form of the alkali metal salt, is reacted with at least 2 mols of diethyl-amine at normal or elevated temperatures. The dyestuff obtained is then isolated by salting out with sodium chloride or potassium chloride, or by acidifying (pH value: 1) the dyestuff solution and filtering, or by spray-drying the neutralized reaction mixture.

Another method to carry out the reaction described above is to treat with 1 mol of diethylamine in an aqueous medium 1 mol of the starting dyestuff containing a β-hydroxy-ethyl-sulfonyl-sulfuric acid ester group in form of its alkali metal salt in the presence of an alkaline agent, such as sodium hydroxide, potassium hydroxide, sodium carbonate or potassium carbonate.

With the same result there may also be used for the preparation of the new monoazo dyestuff of the formula shown above according to the present invention the mixture resulting from the manufacture of the starting dyestuff, which without intermediate isolation of the coupling product may directly be subjected to the reaction with diethylamine.

Another possibility of preparing the new monoazo dyestuff is to react, when using a starting dyestuff containing a vinylsulfonyl group, 1 mol of this compound in aqueous solution at room tempearture or at elevated temperature with 1 to 1.1 mol of diethylamine and then to separate the dyestuff from the solution by spray-drying.

The dyestuff obtained according to the present invention is preferably used for the dyeing of cellulose materials, such as cotton, linen or viscose rayon. It is likewise appropriate for the dyeing of nitrogen-containing fibers of animal as well as of synthetic origin, such as wool and polyacrylonitrile fibers.

The new dyestuff is furthermore suitable for the printing of cellulose fibers. For that purpose it is printed in form of a thickening paste containing the dyestuff and an alkaline agent, such as sodium hydroxide, potassium hydroxide, potassium carbonate or sodium carbonate, and the print is subjected to a treatment by heat, for example by steam. The printing pastes used for the preparation of the print which contain an alkaline agent are very resistant to alkalies. In this respect the new dyestuff is much superior to the above mentioned starting dyestuff containing the β-hydroxyethyl-sulfonyl-sulfuric acid ester group.

The dyestuff obtained according to the present invention has a high tinctorial strength. It may be used for the preparation of yellow cotton dyeings and prints which are distinguished by purity of the tint as well as by very good fastness to washing, rubbing, and wet processing and which proves moreover a good fastness to light.

As to building-up and tinctorial strength of the dyeings as well as to clarity of the shades, the monoazo dyestuff obtained according to the process of the present invention is essentially superior to the yellow monoazo dyestuffs of comparable structure, known from the German patent specification No. 1,103,886.

The following examples serve to illustrate the invention, but they are not intended to limit it thereto; the parts and percentages being by weight unless stated otherwise.

Example 1

65.8 parts of the dyestuff of the formula

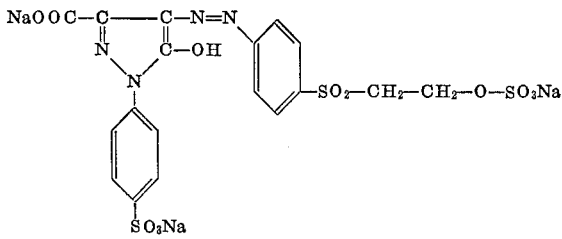

were dissolved at room temperature in 700 parts of water and then mixed, while stirring, with 15.3 parts of diethylamine. The batch was then stirred for another 16 hours at room temperature. After that period of time the formed dyestuff precipitated. It was filtered off and dried at 60° C.

68 parts of a yellow, water-soluble powder were obtained which yields on cotton, linen or regenerated cellulose in the presence of alkalies, such as sodium carbonate, sodium hydroxide or potassium carbonate, yellow dyeings or prints, which are distinguished by very good fastness to washing, rubbing and wet processing and by a good fastness to light.

Example 2

65.8 parts of the starting dyestuff of the formula shown in Example 1 were dissolved in 700 parts of water at room temperature and then mixed with 7.5 parts of diethylamine.

About 23 parts of a sodium hydroxide solution of 33% strength were added dropwise to the reaction mixture until a pH-value of 12 was obtained and the whole was then stirred for 16 hours at the same temperature. By addition of 25% of sodium chloride (referred to the volume of the dyestuff solution) the dyestuff was precipitated and filtered off. After drying at 60° C., 72 parts of a yellow powder were obtained which was identical to the dyestuff prepared according to Example 1.

Example 3

65.8 parts of the starting dyestuff of the formula shown in Example 1 were dissolved in 700 parts of water at room temperature. The solution was then mixed with 25 parts of sodium carbonate and 8 parts of diethylamine. The reaction mixture, showing an alkaline reaction (phenolphthalein) was stirred for another 20 hours at room temperature. By addition of 115 parts of hydrochloric acid of 36.5% strength the mixture was adjusted to a pH-value of 0.5, the precipitated dyestuff was filtered off and dried at 60° C. 67 parts of a yellow powder were obtained, identical to the dyestuff obtained according to Example 1.

Example 4

281 parts of the sulfuric acid ester of 1-aminobenzene-4-β-hydroxyethyl-sulfone were poured into 1,000 parts of water and stirred for 1 hour. Then 1,000 parts of ice powder and 150 parts of hydrochloric acid of 36.5% strength were added to the solution and the amine was diazotized at 0 to 5° C. by the addition of 205 parts by volume of a 5 N sodium nitrite solution. The diazonium mixture was stirred for 2 hours and the excess nitrous acid was then destroyed by means of amidosulfonic acid.

284 parts of 1-(4'-sulfophenyl)-3-carboxy-pyrazolone-(5) were dissolved in 1,000 parts of water and 258 parts of a sodium hydroxide solution of 33% strength and clarified by addition of 20 parts of animal charcoal. The filtered solution was then poured into the afore-mentioned diazo suspension obtained and the mixture was adjusted to a pH-value of 4.5 to 5 by dropwise addition of 265 parts of a sodium carbonate solution of 20% strength. To the solution of the coupling product 80 parts of diethylamine and then 230 parts of a sodium hydroxide solution of 33% strength were added. In order to complete the reaction, the mixture was stirred for another 16 hours at room temperature and then neutralized by addition of 155 parts of hydrochloric acid of 36.5% strength. The reaction product was then isolated by spray-drying of the dyestuff solution at 150° C. 1,025 parts of a yellow powder were obtained, corresponding to the dyestuff prepared as described in Example 1.

We claim:
1. Water-soluble monoazo dyestuffs having the formula

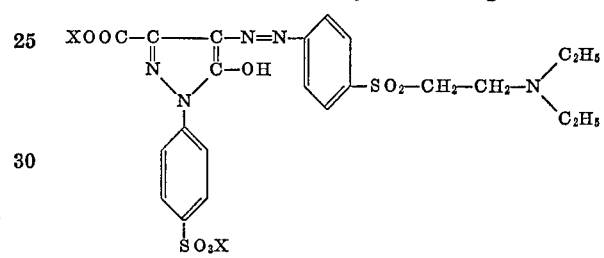

in which X represents hydrogen, sodium or potassium.

References Cited
FOREIGN PATENTS
1,103,886  4/1961  Germany.

CHARLES B. PARKER, Primary Examiner
DONALD M. PAPUGA, Assistant Examiner

U.S. Cl. X.R.
8—41, 54, 55